(12) United States Patent
Lee et al.

(10) Patent No.: US 7,881,302 B2
(45) Date of Patent: Feb. 1, 2011

(54) APPARATUS AND METHOD FOR MANAGING CONNECTION IDENTIFIER IN A COMMUNICATION SYSTEM

(75) Inventors: Ok-Seon Lee, Suwon-si (KR); Jong-Hyung Kwun, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

(21) Appl. No.: 12/321,431

(22) Filed: Jan. 21, 2009

(65) Prior Publication Data

US 2009/0185567 A1 Jul. 23, 2009

(30) Foreign Application Priority Data

Jan. 21, 2008 (KR) ...................... 10-2008-0006334

(51) Int. Cl.
H04L 12/28 (2006.01)

(52) U.S. Cl. .................................... 370/395.3; 370/389

(58) Field of Classification Search ........................ None
See application file for complete search history.

(56) References Cited

U.S. PATENT DOCUMENTS

| 5,084,877 | A  | * | 1/1992  | Netravali et al. ............. 714/748 |
| 5,519,690 | A  | * | 5/1996  | Suzuka et al. ............ 370/395.3 |
| 5,991,297 | A  | * | 11/1999 | Palnati et al. ................ 370/389 |
| 7,633,863 | B2 | * | 12/2009 | Kim et al. .................... 370/230 |
| 2002/0080820 | A1 | * | 6/2002 | Hashem et al. ............. 370/471 |
| 2007/0099649 | A1 | * | 5/2007 | Han et al. .................... 455/525 |
| 2009/0010243 | A1 | * | 1/2009 | Hiddink ...................... 370/346 |
| 2009/0017834 | A1 | * | 1/2009 | Lim et al. ................... 455/450 |
| 2009/0059858 | A1 | * | 3/2009 | Lee et al. .................... 370/329 |
| 2009/0185567 | A1 | * | 7/2009 | Lee et al. ................. 370/395.3 |
| 2010/0135254 | A1 | * | 6/2010 | Youn .......................... 370/331 |

* cited by examiner

Primary Examiner—Robert W Wilson

(57) ABSTRACT

An apparatus and method for managing a Connection IDentifier (CID) in a communication system are provided. The method includes mapping a different index to at least one CID allocated by a base station (BS) and, if simultaneously transmitting packets for at least two CIDs, indexing a CID for packet transport by an index mapped to each CID and simultaneously transmitting packets for at least two CIDs.

20 Claims, 7 Drawing Sheets

APPARATUS AND METHOD FOR MANAGING CONNECTION IDENTIFIER IN A COMMUNICATION SYSTEM

CROSS-REFERENCE TO RELATED APPLICATION(S) AND CLAIM OF PRIORITY

The present application claims priority under 35 U.S.C. §119(a) to a Korean Patent Application filed in the Korean Intellectual Property Office on Jan. 21, 2008 and assigned Serial No. 10-2008-0006334, the contents of which are herein incorporated by reference.

TECHNICAL FIELD OF THE INVENTION

The present invention relates generally to a communication system. More particularly, the present invention relates to an apparatus and method for managing several Connection IDentifiers (CIDs) included in one mobile station (MS) in a communication system.

BACKGROUND OF THE INVENTION

A communication system allocates a Transport Connection IDentifier (TCID) on a per service-flow basis to each mobile station (MS). Thus, a base station (BS) can identify if packets received through TCIDs received from MSs located in a service area are for any service flow of any MS. For example, when an MS requests uplink bandwidth allocation, the MS requests an uplink bandwidth on the basis of a CID allocated to a service flow. A BS confirms the service flow requesting the uplink bandwidth through the CID received from the MS.

One MS includes several CIDs and, thus, can simultaneously transmit packets for several CIDs. For example, if requesting an uplink bandwidth, an MS constructs and transmits uplink bandwidth request information on several CIDs as shown in FIG. 1. That is, the MS constructs an uplink bandwidth request message for several CIDs using a generic Media Access Control (MAC) header and a band request header.

FIG. 1 is a diagram illustrating a structure for transmitting packets for a plurality of CIDs in an MS of a communication system according to the conventional art. The following description is made assuming that packets of a plurality of CIDs including a CID included in a generic MAC header are transmitted.

As shown in FIG. 1, if requesting an uplink bandwidth, an MS 110 constructs a message including uplink bandwidth allocation request information on a CID #205 (hereinafter, referred to as "$1^{st}$ CID") 101, a CID #302 (hereinafter, referred to as "$2^{nd}$ CID") 103, and a CID #4331 (hereinafter, referred to as "$3^{rd}$ CID") 105. At this time, the MS 110 includes the bandwidth allocation request information on the $1^{st}$ CID 101 included in a generic MAC header 120 using a grant management sub header 130 of 2 bytes. The MS 110 includes the bandwidth allocation request information on the $2^{nd}$ CID 103 and $3^{rd}$ CID 105 using bandwidth request headers 140 and 150 of 6 bytes.

Thus, the MS 110 concatenates and transmits the generic MAC header 120, the grant management sub header 130, the bandwidth request header 140, and the bandwidth request header 150 to a BS. The generic MAC header 120 includes the $1^{st}$ CID 101. The grant management sub header 130 includes a bandwidth information 102 required by the $1^{st}$ CID 101. The bandwidth request header 140 includes a bandwidth information 104 required by the $2^{nd}$ CID 103, and the $2^{nd}$ CID 103 information. The bandwidth request header 150 includes a bandwidth information 106 required by the $3^{rd}$ CID 105, and the $3^{rd}$ CID 105 information.

The BS confirms the $1^{st}$ CID 101 in the generic MAC header 120 of the message constructed as above, and confirms the bandwidth information 102 required by the $1^{st}$ CID 101 in the grant management sub header 130. The BS confirms the $2^{nd}$ CID 103 and the bandwidth information 104 required by the $2^{nd}$ CID 103 through the bandwidth request header 140. The BS confirms the $3^{rd}$ CID 105 and the bandwidth information 106 required by the $3^{rd}$ CID 105 through the bandwidth request header 150.

After that, the BS allocates an uplink bandwidth to the MS according to a bandwidth required by each of CIDs.

As described above, if one MS transmits packets for a plurality of CIDs, the MS uses a grant management sub header of 2 bytes for a CID included in a generic MAC header. Also, the MS transmits a packet using a separate header for CIDs not included in the generic MAC header and thus, there is a problem of increasing an overhead.

SUMMARY OF THE INVENTION

To address the above-discussed deficiencies of the prior art, it is a primary aspect of the present invention to substantially solve at least the above problems and/or disadvantages and to provide at least the advantages below. Accordingly, one aspect of the present invention is to provide an apparatus and method for simultaneously transmitting packets of a plurality of Connection IDentifiers (CIDs) allocated to one mobile station (MS) in a communication system.

Another aspect of the present invention is to provide an apparatus and method for, when an MS simultaneously transmits packets of a plurality of CIDs, reducing an overhead using a piggyback CID index mapped to each CID in a communication system.

A further aspect of the present invention is to provide an apparatus and method for performing mapping between a plurality of CIDs allocated to one MS and piggyback CID indexes on a point-to-point basis for management in a communication system.

The above aspects are achieved by providing an apparatus and method for managing a CID in a communication system.

According to one aspect of the present invention, a method for managing a CID in an MS of a communication system is provided. The method includes mapping a unique index to at least one CID allocated by a base station (BS) and, if simultaneously transmitting packets for at least two CIDs, indexing a CID for packet transport by an index mapped to each CID and simultaneously transmitting packets for at least two CIDs.

According to another aspect of the present invention, a method for managing a CID in a BS of a communication system. The method includes mapping a different index to at least one CID allocated to at least one MS and, if receiving packets for at least two CIDs allocated to an MS, confirming CIDs for packet transport through indexes indexed in respective packets.

According to a further aspect of the present invention, an apparatus for managing a CID in an MS of a communication system is provided. The apparatus includes a controller and a transmitter. The controller maps a unique index to at least one CID allocated by a BS. If simultaneously transmitting packets for at least two CIDs, the transmitter indexes a CID for packet transport by an index mapped to each CID and simultaneously transmits packets for at least two CIDs.

According to a yet another aspect of the present invention, an apparatus for managing a CID in a BS of a communication system is provided. The apparatus includes a receiver and a controller. The receiver receives a signal. The controller maps a different index to at least one CID allocated to at least one MS and, if receiving packets for at least two CIDs allocated to an MS, confirms CIDs for packet transport through indexes indexed to respective packets.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE PREFERRED EMBODIMENTS

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

A technology for managing piggyback Connection IDentifier (CID) indexes mapped to a plurality of CIDs allocated to one mobile station (MS) in a communication system according to an exemplary embodiment of the present invention is described below. The piggyback CID indexes represent indexes of CIDs allocated to Service Flows (SFs) of each MS.

Figure 1:
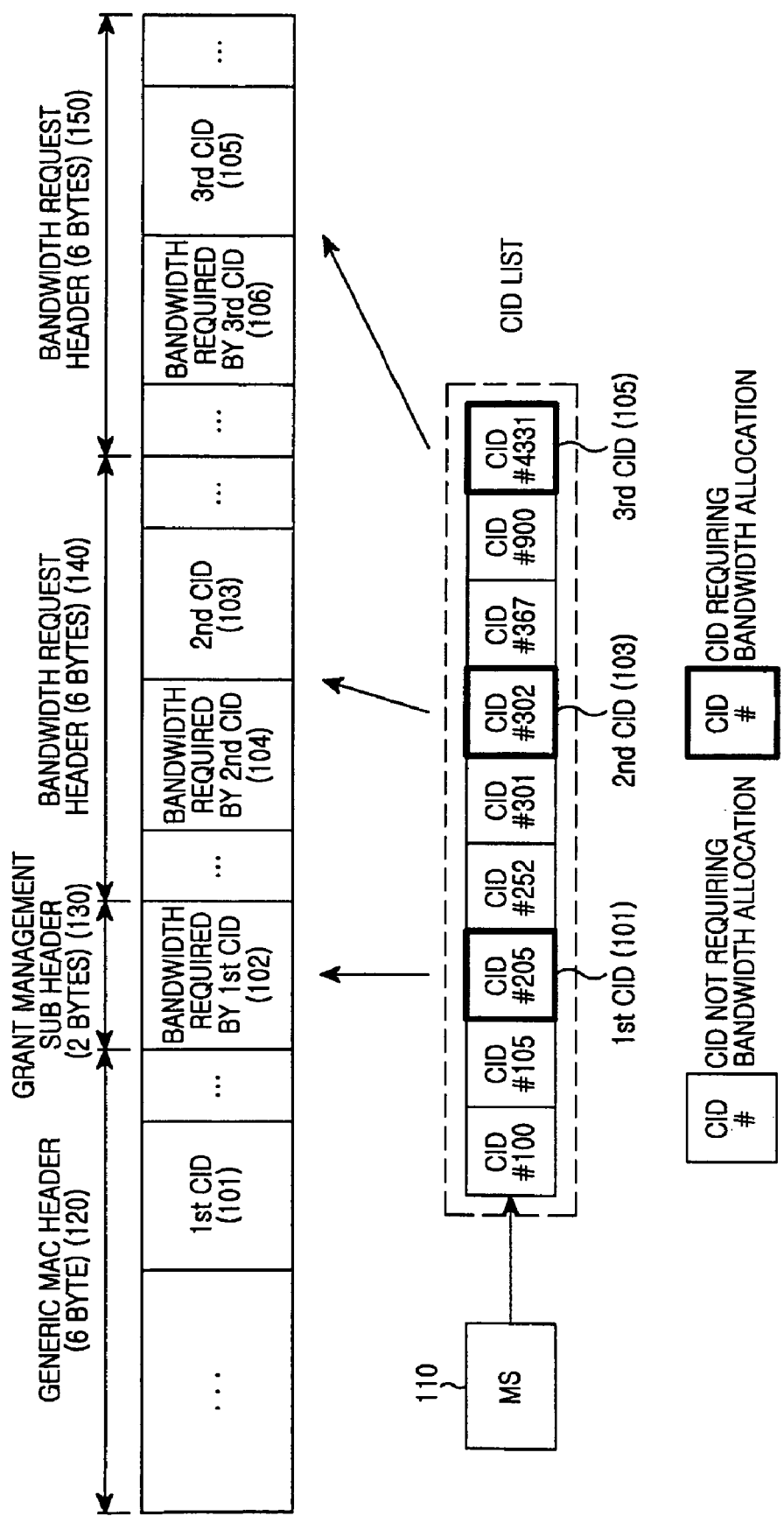
FIG. 1 is a diagram illustrating a structure for transmitting packets for a plurality of Connection IDentifiers (CIDs) in a mobile station (MS) of a communication system according to the conventional art.
Figure 2:
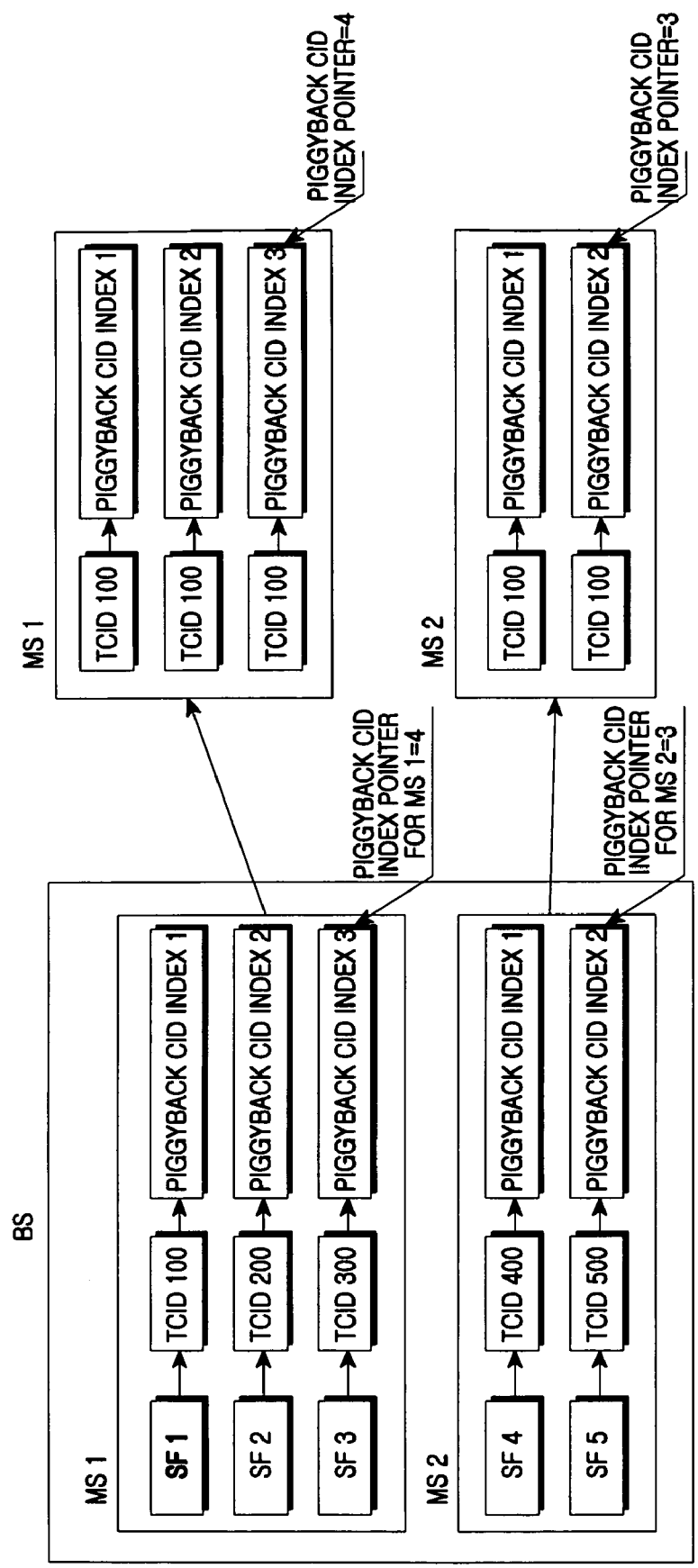
FIGS. 2A and 2B are diagrams illustrating mapping tables between CIDs and piggyback CID indexes in a communication system according to an exemplary embodiment of the present invention.

A base station (BS) of a communication system manages CIDs using piggyback CID indexes each mapped to CIDs allocated to SFs of each MS. Also, an MS manages CIDs using piggyback CID indexes mapped to CIDs of SFs allocated by a BS. For example, the BS and MS manage CIDs by mapping piggyback CID indexes to the CIDs, respectively, as shown in FIG. 2.

FIGS. 2A and 2B are diagrams illustrating mapping tables between CIDs and piggyback CID indexes in a communication system according to an exemplary embodiment of the present invention.

In detail, FIG. 2A illustrates a structure for managing piggyback CID indexes mapped to respective CIDs in a BS, and FIG. 2B illustrates a structure for managing piggyback CID indexes mapped to respective CIDs in an MS.

As shown in FIG. 2A, a BS includes mapping tables including piggyback CID indexes mapped to CIDs allocated to SFs of an MS 1 and an MS 2 that are located in a service area.

The BS manages a mapping table using a piggyback CID index pointer. That is, when mapping a CID to a piggyback CID index, the BS maps a CID to a piggyback CID index indicated by the piggyback CID index pointer of the mapping table. After that, the BS increases the piggyback CID index pointer by '1' until finding a piggyback CID index not mapped to a CID. At this time, the BS performs a control such that the piggyback CID index pointer is within a given range. That is, if the piggyback CID index pointer is out of the given range, the BS sets the piggyback CID index pointer as an initial value.

As shown in FIG. 2B, an MS includes a mapping table including piggyback CID indexes mapped to CIDs of SFs.

The MS manages the mapping table using a piggyback CID index pointer. That is, when mapping a CID to a piggyback CID index, the MS maps a CID to a piggyback CID index indicated by the piggyback CID index pointer of the mapping table. After that, the MS increases the piggyback CID index pointer by '1' until finding a piggyback CID index not mapped to a CID. At this time, the MS performs a control such that the piggyback CID index pointer is within a given range. That is, if the piggyback CID index is out of the given range, the MS sets the piggyback CID index pointer as an initial value.

As described above, a BS and an MS manage CIDs by mapping the CIDs and piggyback CID indexes. Thus, when simultaneously transmitting packets of a plurality of CIDs for one MS, the MS transmits a plurality of packets using a piggyback CID index having a smaller size than a CID and, thus, can reduce an overhead. For example, if requesting an uplink bandwidth, an MS substitutes CIDs requesting the uplink bandwidth with piggyback CID indexes, thus being able to reduce a size of an uplink bandwidth request message.

Figure 3:
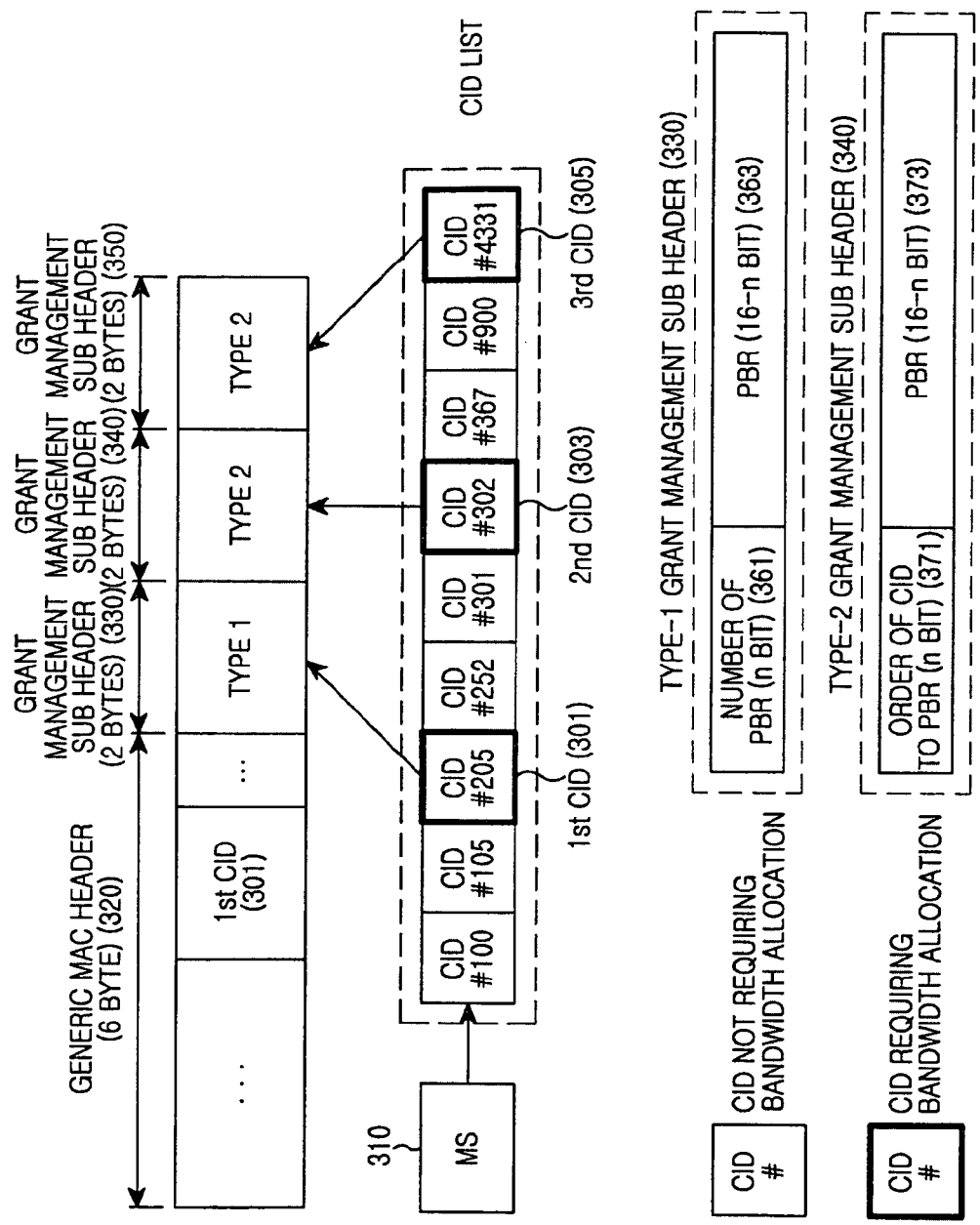
FIG. 3 is a diagram illustrating a structure of a header used to transmit packets for a plurality of CIDs in an MS of a communication system according to an exemplary embodiment of the present invention.

FIG. 3 is a diagram illustrating a structure for transmitting packets for a plurality of CIDs in an MS of a communication system according to an exemplary embodiment of the present invention. The following description is made assuming that packets of a plurality of CIDs including a CID included in a generic MAC header are transmitted.

As shown in FIG. 3, an MS 310 constructs an uplink bandwidth request message in order to request uplink bandwidth allocation for a CID #205 (hereinafter, referred to as "$1^{st}$ CID") 301, a CID #302 (hereinafter, referred to as "$2^{nd}$ CID") 303, and a CID #4331 (hereinafter, referred to as "$3^{rd}$ CID") 305. At this time, the MS 310 requests bandwidth allocation for the $1^{st}$ CID 301 using a grant management sub header 330 of a type 1. The MS 310 requests bandwidth allocation for the $2^{nd}$ CID 303 and $3^{rd}$ CID 305 using grant management sub headers 340 and 350 of a type 2.

Thus, the MS 310 concatenates and transmits the generic MAC header 320 including the $1^{st}$ CID 301, the type-1 grant management sub header 330 for the $1^{st}$ CID 301, the type-2 grant management sub header 340 for the $2^{nd}$ CID 303, and the type-2 grant management sub header 350 for the $3^{rd}$ CID 305 to a BS. The type-1 grant management sub header 330 includes a total number of CIDs requiring uplink bandwidth allocation, and bandwidth information required by the $1^{st}$ CID 301. The type-2 grant management sub header 340 for the $2^{nd}$ CID 303 includes the piggyback CID index information mapped to the $2^{nd}$ CID 303 and bandwidth information required by the $2^{nd}$ CID 303. The type-2 grant management sub header 350 for the $3^{rd}$ CID 305 includes piggyback CID index information mapped to the $3^{rd}$ CID 305 and bandwidth information required by the $3^{rd}$ CID 305.

The BS confirms the $1^{st}$ CID 301 in the generic MAC header 320 of the uplink bandwidth request message constructed as above, and confirms the number 361 of CIDs requesting a bandwidth and bandwidth information 363 required by the $1^{st}$ CID 301 in the type-1 grant management sub header 330. Also, the BS confirms the $2^{nd}$ CID information 371 mapped to the piggyback CID index of the type-2 grant management sub header 340 and bandwidth information 373 required by the $2^{nd}$ CID 303. Also, the BS confirms the $3^{rd}$ CID 305 mapped to the piggyback CID index of the type-2 grant management sub header 350 and bandwidth information required by the $3^{rd}$ CID 305.

After that, the BS allocates an uplink bandwidth to the MS depending on the bandwidth information required by the respective CIDs.

Figure 4:
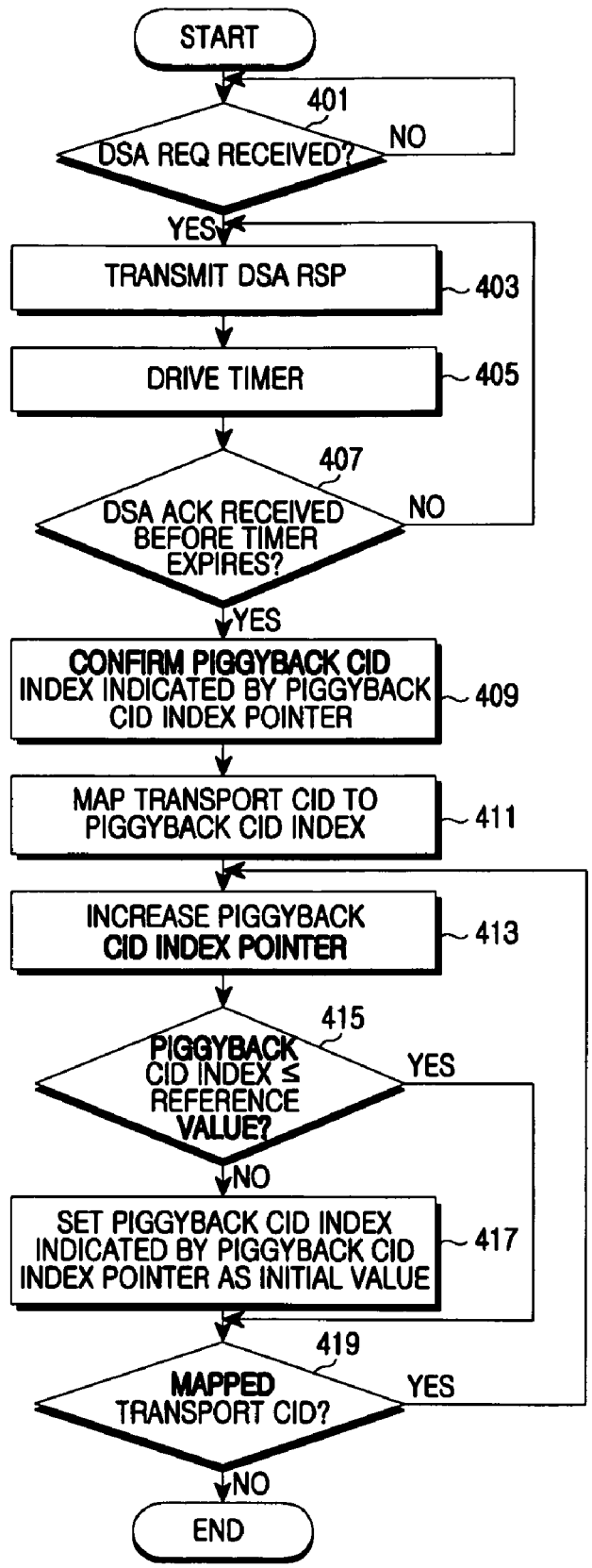
FIG. 4 is a flow diagram illustrating a process of piggyback CID index mapping according to Dynamic Service Addition (DSA) in a communication system according to an exemplary embodiment of the present invention.
Figure 5:
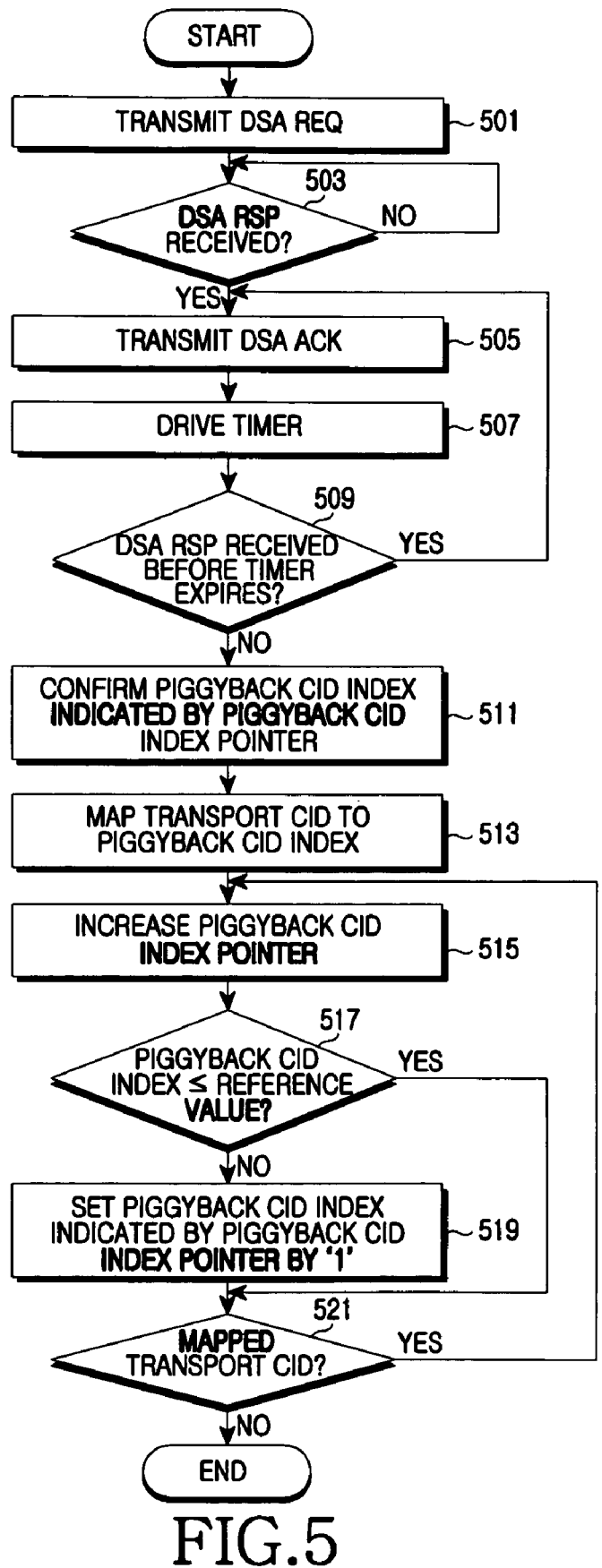
FIG. 5 is a flow diagram illustrating a process of piggyback CID index mapping according to DSA in a communication system according to another exemplary embodiment of the present invention.

As shown in FIGS. 4 and 5, a BS and an MS map a piggyback CID index to each CID. The following description is made assuming that a piggyback CID index is mapped to a CID through Dynamic Service Addition (DSA). If the BS sends a DSA request to the MS, the MS performs a piggyback CID index mapping process of FIG. 4, and the BS performs a piggyback CID index mapping process of FIG. 5.

If an MS sends a DSA request to a BS, the BS performs a piggyback CID index mapping process of FIG. 4, and the MS performs a piggyback CID index mapping process of FIG. 5. The following description is made assuming that the BS sends a DSA request to the MS. Thus, the MS maps a piggyback CID index to an added CID as shown in FIG. 4.

FIG. 4 is a flow diagram illustrating a process of piggyback CID index mapping according to DSA in a communication system according to an exemplary embodiment of the present invention.

Referring to FIG. 4, in step 401, an MS confirms if a DSA REQuest signal (DSA REQ) is received from a BS.

If the DSA REQ is received, in step 403, the MS transmits a DSA ReSPonse signal (DSA RSP) responsive to the DSA REQ to the BS.

Then, in step 405, the MS drives a timer expiring after a predetermined time.

Then, in step 407, the MS confirms if a DSA ACKnowledgement signal (DSA ACK) responsive to the DSA RSP is received before the timer expires.

If the DSA ACK responsive to the DSA RSP is not received before the driven timer of step 405 expires, the MS returns to step 403 and again transmits a DSA RSP to the BS. At this time, the MS resets the timer.

If the DSA ACK responsive to the DSA RSP is received before the driven timer of step 405 expires, the MS goes to step 409 and confirms a piggyback CID index indicated by a piggyback CID index pointer in a mapping table.

Then, in step 411, the MS map the piggyback CID index indicated by the piggyback CID index pointer to a CID newly allocated by the BS according to DSA.

After mapping the piggyback CID index to the newly allocated CID, in step 413, the MS increases a piggyback CID index pointer. At this time, the MS increases the piggyback CID index pointer by '1'.

After increasing the piggyback CID index pointer, in step 415, the MS confirms if the increased piggyback CID index pointer is within a range of a piggyback CID index pointer.

If the increased piggyback CID index pointer of step 413 is within the range of the piggyback CID index pointer, the MS goes to step 419 and confirms if there is a TCID mapped to a piggyback CID index indicated by the piggyback CID index pointer.

If the increased piggyback CID index pointer of step 413 is out of the range of the piggyback CID index pointer, the MS goes to step 417 and initializes the piggyback CID index pointer. That is, the MS sets the piggyback CID index pointer as an initial value.

After initializing the piggyback CID index pointer, in step 419, the MS confirms if there is a TCID mapped to a piggyback CID index indicated by the piggyback CID index pointer.

If there is a TCID mapped to the piggyback CID index indicated by the piggyback CID index pointer in step 419, the MS returns to step 413 and increases the piggyback CID index pointer.

If there is not a TCID mapped to the piggyback CID index indicated by the piggyback CID index pointer in step 419, the MS terminates the process according to an exemplary embodiment of the present invention.

As described above, if an MS maps a piggyback CID index to a CID, a BS requesting DSA maps a piggyback CID index to a CID as shown in FIG. 5.

FIG. 5 is a flow diagram illustrating a process of piggyback CID index mapping according to DSA in a communication system according to another exemplary embodiment of the present invention.

Referring to FIG. 5, in step 501, a BS transmits a DSA REQ to an MS so as to request DSA.

After transmitting the DSA REQ, in step 503, the BS confirms if a DSA RSP responsive to the DSA REQ is received from the MS.

If the DSA RSP is received, in step 505, the BS transmits a DSA ACK responsive to the DSA RSP to the MS.

Then, in step 507, the BS drives a timer expiring after a predetermined time.

Then, in step 509, the BS confirms if a DSA RSP responsive to a DSA REQ is again received before the timer expires.

If the DSA RSP responsive to the DSA REQ is again received before the driven timer of step 507 expires, the BS returns to step 505 and again transmits a DSA ACK responsive to the DSA RSP to the MS. At this time, the BS resets the timer.

If the DSA RSP responsive to the DSA REQ is not received before the driven timer of step 509 expires, the BS goes to step 511 and confirms a piggyback CID index indicated by a piggyback CID index pointer.

Then, in step 513, the BS maps the piggyback CID index indicated by the piggyback CID index pointer to a CID newly allocated to the MS according to DSA.

After mapping the piggyback CID index to the CID, in step 515, the BS increases the piggyback CID index pointer. At this time, the BS increases the piggyback CID index pointer by '1'.

After increasing the piggyback CID index pointer, in step 517, the BS confirms if the increased piggyback CID index pointer is within a range of a piggyback CID index pointer.

If the increased piggyback CID index pointer of step 515 is within the range of the piggyback CID index pointer, the BS goes to step 521 and confirms if there is a TCID mapped to a piggyback CID index indicated by the piggyback CID index pointer.

If the increased piggyback CID index pointer of step 515 is out of the range of the piggyback CID index pointer, the BS goes to step 519 and initializes the piggyback CID index pointer. That is, the BS sets the piggyback CID index pointer as an initial value.

After initializing the piggyback CID index pointer, in step 521, the BS confirms if there is a TCID mapped to a piggyback CID index indicated by the piggyback CID index pointer.

If there is a TCID mapped to a piggyback CID index indicated by the piggyback CID index pointer in step 521, the BS returns to step 515 and increases the piggyback CID index pointer.

If there is not a TCID mapped to a piggyback CID index indicated by the piggyback CID index pointer in step 521, the BS terminates the process according to an exemplary embodiment of the present invention.

As described above, a BS and an MS map a piggyback CID index to a CID added according to DSA, and update a mapping table. Also, the BS and the MS unmap a piggyback CID index mapped to a CID deleted according to DSD, and update the mapping table.

FIGS. 6A, 6B, and 6C are diagrams illustrating mapping tables for managing CIDs and mapped piggyback CID indexes in a communication system according to an exemplary embodiment of the present invention.

In detail, FIG. 6A illustrates mapping tables managed in a BS and an MS, FIG. 6B illustrates mapping tables updated according to DSD, and FIG. 6C illustrates mapping tables updated according to DSA.

As shown in FIG. 6A, a BS constructs a mapping table including piggyback CID index information mapped to CIDs allocated to SFs of an MS. Also, the MS constructs a mapping table including piggyback CID index information mapped to CIDs of SFs allocated by the BS. The piggyback CID index information mapped to the CIDs, which are included in the mapping tables of the BS and MS, are the same as each other. For example, the mapping tables of the BS and MS include the same information on a piggyback CID index #1 mapped to a CID #100 of an SF #1.

As shown in FIG. 6B, if performing DSD for a CID #200, a BS deletes the CID #200 mapped to a piggyback CID index #2 from a mapping table. Also, an MS deletes the CID #200 mapped to a piggyback CID index #2 from a mapping table.

Figure 6:
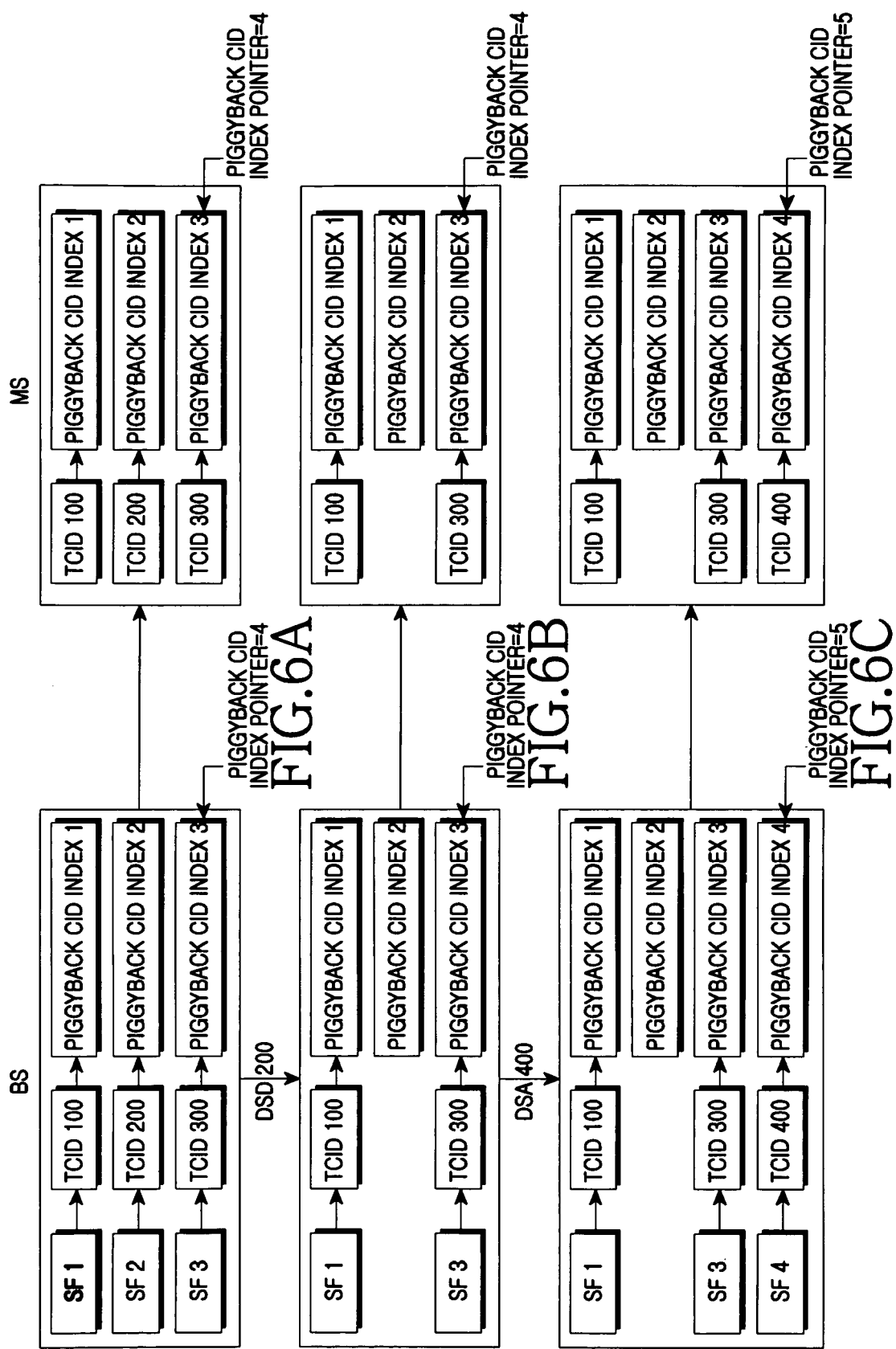
FIGS. 6A, 6B, and 6C are diagrams illustrating mapping tables for managing CIDs and mapped piggyback CID indexes in a communication system according to an exemplary embodiment of the present invention.

If performing DSA for a CID #400 in the mapping table of FIG. 6B, the BS maps the CID #400 to a piggyback CID index #4 indicated by a piggyback CID index pointer as shown in FIG. 5 or 6. Also, the MS maps the CID #400 to a piggyback CID index #4 indicated by a piggyback CID index pointer as shown in FIG. 5 or 6.

Figure 7:
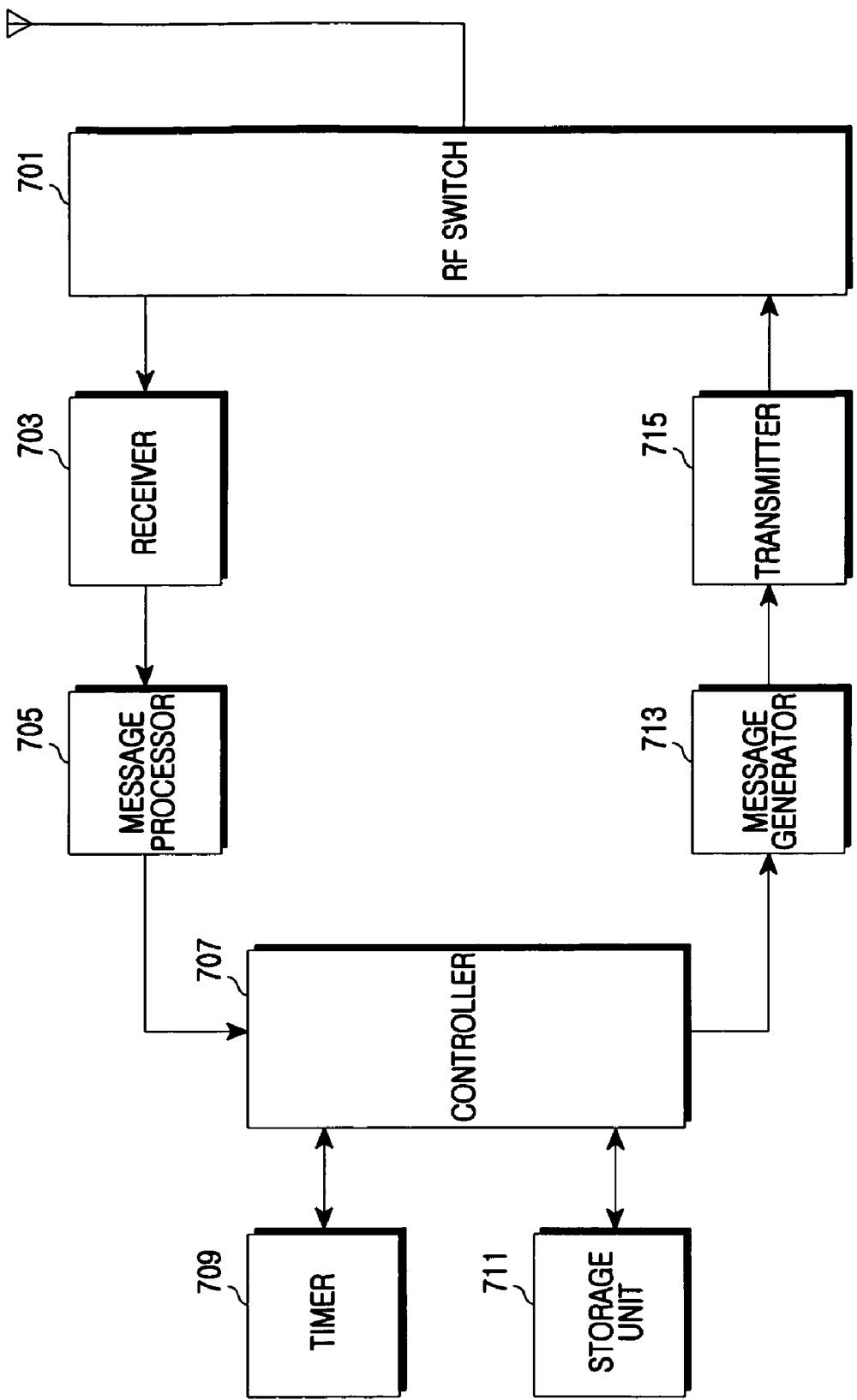
FIG. 7 is a block diagram illustrating a construction of an apparatus for managing CIDs and mapped piggyback CID indexes in a communication system according to an exemplary embodiment of the present invention.

As described above, an MS and a BS are constructed as shown in FIG. 7 so as to map and manage CIDs and piggyback CID indexes. Constructions of the MS and BS for mapping and managing the CIDs and piggyback CID indexes are the same as each other and thus, the constructions of the MS and BS are described using FIG. 7.

FIG. 7 is a block diagram illustrating a construction of an apparatus for managing CIDs and mapped piggyback CID indexes in a communication system according to an exemplary embodiment of the present invention. The communication system is described assuming that a Time Division Duplexing (TDD) scheme is used.

As shown in FIG. 7, an MS includes a radio frequency (RF) switch 701, a receiver 703, a message processor 705, a controller 707, a timer 709, a storage unit 711, a message generator 713, and a transmitter 715.

The RF switch 701 performs switching such that an antenna and the receiver 703 connect with each other to receive a signal in a reception mode. The RF switch 701 performs switching such that the transmitter 715 and the antenna connect with each other to transmit a signal in a transmission mode.

The receiver 703 converts a high frequency signal received through the RF switch 701 into a baseband signal.

The message processor 705 processes a control message received from the receiver 703 and provides the results to the controller 707. For example, if the MS requests DSA, the message processor 705 provides the controller 707 with a DSA response message received from a BS responsive to a DSA request. If the BS requests DSA, the message processor 705 provides a DSA request message received from the BS and a DSA acknowledgement message responsive to the DSA request message to the controller 707.

The controller 707 performs mapping between CIDs by SF and piggyback CID indexes according to a control message received from the message processor 705.

The controller 707 manages mapping between the CIDs and the piggyback CID indexes according to DSA and DSD. For example, if performing DSA, the controller 707 maps a piggyback CID index indicated by a piggyback CID index pointer to a CID allocated by a BS according to DSA.

In another exemplary embodiment of the present invention, if performing DSD, the controller 707 deletes a CID from a mapping table stored in the storage unit 711 according to DSD.

The timer 709 operates under the control of the controller 707 and automatically expires after a predetermined time. For example, if a BS requests DSA, the timer 709 is reset at a time a DSA response signal responsive to a DSA request message is transmitted under the control of the controller 707. If an MS requests DSA, the timer 709 is reset at a time a DSA acknowledgement signal responsive to a DSA response signal responsive to a DSA request message is transmitted under the control of the controller 707.

The storage unit 711 generates and updates a mapping table under the control of the controller 707 as shown in FIG. 6.

The message generator 713 generates a control message transmitted to a BS under the control of the controller 707. For example, if an MS requests DSA, the message generator 713 generates a DSA request message and a DSA acknowledgement message responsive to the DSA request message under the control of the controller 707. If a BS requests DSA, the message generator 713 generates a DSA response message responsive to a DSA request message under the control of the controller 707.

In another example, if requesting an uplink bandwidth, the message generator 713 generates an uplink bandwidth request message of indexing CIDs requesting uplink bandwidths with piggyback CID indexes. At this time, the message generator 713 generates an uplink bandwidth request message constructed as shown in FIG. 3.

The transmitter 715 converts a control message received from the message generator 713 and transmission data into a high frequency signal, and transmits the converted signal to a BS through the RF switch 701 and the antenna.

In the case of a BS, the BS includes an RF switch 701, a receiver 703, a message processor 705, a controller 707, a timer 709, a storage unit 711, a message generator 713, and a transmitter 715.

The RF switch 701 performs switching such that an antenna and the receiver 703 connect with each other to receive a signal in a reception mode. The RF switch 701 performs switching such that the transmitter 715 and the antenna connect with each other to transmit a signal in a transmission mode.

The receiver 703 converts a high frequency signal received through the RF switch 701 into a baseband signal.

The message processor 705 processes a control message received from the receiver 703 and provides its result to the controller 707. For example, if an MS requests DSA, the message processor 705 provides a DSA request message received from the MS and a DSA acknowledgement message responsive to the DSA request message to the controller 707. If a BS requests DSA, the message processor 705 provides a DSA response message responsive to the DSA request message received from the MS, to the controller 707.

The controller 707 performs mapping between CIDs by SF and piggyback CID indexes according to a control message received from the message processor 705.

The controller 707 manages mapping between the CIDs and the piggyback CID indexes according to DSA and DSD. For example, if performing DSA, the controller 707 maps a piggyback CID index indicated by a piggyback CID index pointer to a CID allocated to an MS according to DSA.

In another exemplary embodiment of the present invention, if performing DSD, the controller 707 deletes a CID from a mapping table stored in the storage unit 711 according to DSD.

Also, if an MS requests an uplink bandwidth, the controller 707 confirms CIDs requesting uplink bandwidths according to piggyback CID indexes included in an uplink bandwidth request message received from the message processor 705.

The timer 709 operates under the control of the controller 707 and automatically expires after a predetermined time. For example, if a BS requests DSA, the timer 709 is reset at a time a DSA acknowledgement signal responsive to a DSA response message responsive to a DSA request message is transmitted under the control of the controller 707. If an MS requests DSA, the timer 709 is reset at a time a DSA response signal responsive to a DSA request message is transmitted under the control of the controller 707.

The storage unit 711 generates and updates a mapping table under the control of the controller 707 as shown in FIG. 6.

The message generator 713 generates a control message transmitted to an MS under the control of the controller 707. For example, if an MS requests DSA, the message generator 713 generates a DSA response message responsive to a DSA request message under the control of the controller 707. If a BS requests DSA, the message generator 713 generates a DSA request message and a DSA acknowledgement message responsive to the DSA request message under the control of the controller 707.

The transmitter 715 converts a control message received from the message generator 713 and transmission data into a high frequency signal, and transmits the converted signal to an MS through the RF switch 701 and the antenna.

As described above, an exemplary embodiment of the present invention has an advantage of, when transmitting packets for a plurality of CIDs, being able to reduce an overhead using a piggyback CID index not the CID by mapping a CID allocated to an MS on a per service-flow basis to each piggyback CID index and updating the mapping information according to DSA or DSD in a communication system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for managing a Connection IDentifier (CID) in a mobile station (MS) of a communication system, the method comprising:
   mapping a unique index to each of two or more Connection IDentifiers allocated by a base station (BS);
   constructing a mapping table comprising the unique index mapped to each of the two or more Connection IDentifiers;
   indexing the two or more Connection IDentifiers for packet transport by the unique index mapped to each of the two or more Connection IDentifiers; and
   simultaneously transmitting packets for the two or more Connection IDentifiers.

2. The method of claim 1, further comprising:
   after constructing the mapping table, mapping an index to a Connection IDentifier newly allocated by a base station when Dynamic Service Addition (DSA) is performed;
   adding the index mapped to the Connection IDentifier to the mapping table; and
   deleting a Connection IDentifier from the mapping table according to Dynamic Service Deletion when Dynamic Service Deletion (DSD) is performed.

3. The method of claim 2, wherein the mapping of the index comprises mapping a newly allocated Connection IDentifier to an index indicated by an index pointer in the mapping table.

4. The method of claim 3, further comprising:
   after mapping the newly allocated Connection IDentifier to the index indicated by the index pointer, increasing an index value indicated by the index pointer until there is an index not mapped to a Connection IDentifier.

5. The method of claim 1, wherein the two or more Connection IDentifiers are allocated to one or more service flows of the mobile station.

6. A method for managing a Connection IDentifier (CID) in a base station (BS) of a communication system, the method comprising:
   mapping a unique index to each of two or more Connection IDentifiers allocated to at least one mobile station (MS); and upon receiving packets for the two Connection IDentifiers allocated to a mobile station, confirming the two or more Connection IDentifiers for packet transport using the unique index mapped to each of the two or more Connection IDentifiers.

7. The method of claim 6, further comprising, after mapping the index, constructing mapping tables comprising index information mapped to a Connection IDentifier.

8. The method of claim 7, further comprising:
   after constructing the mapping table, mapping an index to a Connection IDentifier newly allocated to a mobile station when Dynamic Service Addition (DSA) is performed;
   adding the index mapped to the Connection IDentifier to the mapping table; and
   deleting a Connection IDentifier from the mapping table according to Dynamic Service Deletion when Dynamic Service Deletion (DSD) is performed.

9. The method of claim 8, wherein the mapping of the index comprises mapping the Connection IDentifier newly allocated to the mobile station to an index indicated by an index pointer in the mapping table.

10. The method of claim 9, further comprising, after mapping the Connection IDentifier newly allocated to the mobile station to the index indicated by the index pointer, increasing an index value indicated by the index pointer until there is an index not mapped to a Connection IDentifier.

11. An apparatus for managing a Connection IDentifier (CID) in a mobile station (MS) of a communication system, the apparatus comprising:
   a controller configured to map a unique index to each of two or more Connection IDentifiers allocated by a base station (BS);
   a storage unit configured to store a mapping table comprising the unique index mapped to each of the two or more Connection IDentifiers under the control of the controller; and
   a transmitter configured to index each of the two or more Connection IDentifiers for packet transport by the unique index mapped to each of the two or more Connection IDentifiers, and simultaneously transmit packets for the two Connection IDentifiers.

12. The apparatus of claim 11 wherein the controller maps a Connection IDentifier newly allocated by a base station to an index indicated by an index pointer of the mapping table when Dynamic Service Addition is performed, and performs a control to update the index pointer of the mapping table.

13. The apparatus of claim 12, wherein the controller performs a control to increase an index value indicated by the index pointer of the mapping table until there is an index not mapped to a Connection IDentifier.

14. The apparatus of claim 11, wherein, if performing Dynamic Service Deletion, the controller performs a control to delete a Connection IDentifier from the mapping table according to Dynamic Service Deletion.

15. An apparatus for managing a Connection IDentifier (CID) in a base station (BS) of a communication system, the apparatus comprising:
   a receiver configured to receive a signal; and
   a controller configured to map a unique index to each of two or more Connection IDentifiers allocated to at least one mobile station and, upon receiving packets for the two or more Connection IDentifiers, confirming the two or more Connection IDentifiers for packet transport using the unique index mapped to each of the two or more Connection IDentifiers.

16. The apparatus of claim 15, further comprising a storage unit for storing a mapping table comprising index information mapped to a Connection IDentifier under the control of the controller.

17. The apparatus of claim 16, wherein, if performing Dynamic Service Deletion, the controller performs a control to delete a Connection IDentifier from the mapping table according to Dynamic Service Deletion.

18. The apparatus of claim 16, wherein the controller maps a Connection IDentifier newly allocated to a mobile station to an index indicated by an index pointer of the mapping table when Dynamic Service Addition is performed, and performs a control to update the index pointer of the mapping table.

19. The apparatus of claim 18, wherein the controller performs a control to increase an index value indicated by the index pointer of the mapping table until there is an index not mapped to a Connection IDentifier.

20. The apparatus of claim 15, wherein the two or more Connection IDentifiers are allocated to one or more service flows of the mobile station.

* * * * *